(12) United States Patent
Kim et al.

(10) Patent No.: US 10,315,462 B2
(45) Date of Patent: *Jun. 11, 2019

(54) POLYMER FILM

(71) Applicant: KOLON INDUSTRIES, INC., Gwacheon (KR)

(72) Inventors: Yun-Jo Kim, Yongin (KR); Si-Min Kim, Yongin (KR); Dong-Jin Kim, Yongin (KR)

(73) Assignee: KOLON INDUSTRIES, INC., Gwacheon-si (KR)

( * ) Notice: Subject to any disclaimer, the term of this patent is extended or adjusted under 35 U.S.C. 154(b) by 199 days.

This patent is subject to a terminal disclaimer.

(21) Appl. No.: 14/898,497

(22) PCT Filed: Jun. 27, 2014

(86) PCT No.: PCT/KR2014/005751
§ 371 (c)(1),
(2) Date: Dec. 15, 2015

(87) PCT Pub. No.: WO2014/209061
PCT Pub. Date: Dec. 31, 2014

(65) Prior Publication Data
US 2016/0114627 A1     Apr. 28, 2016

(30) Foreign Application Priority Data
Jun. 28, 2013   (KR) .................. 10-2013-0075868

(51) Int. Cl.
| | | |
|---|---|---|
| *C09J 7/25* | (2018.01) | |
| *B60C 1/00* | (2006.01) | |
| *B32B 27/28* | (2006.01) | |
| *B32B 27/34* | (2006.01) | |
| *B60C 5/14* | (2006.01) | |
| *C08J 5/18* | (2006.01) | |
| *C09J 161/12* | (2006.01) | |
| *C08G 69/14* | (2006.01) | |
| *C08G 69/24* | (2006.01) | |
| *C08G 69/36* | (2006.01) | |
| *C08G 69/40* | (2006.01) | |
| *C08L 77/02* | (2006.01) | |
| *C08L 9/08* | (2006.01) | |
| *C09J 7/38* | (2018.01) | |

(52) U.S. Cl.
CPC .......... *B60C 1/0008* (2013.01); *B32B 27/285* (2013.01); *B32B 27/34* (2013.01); *B60C 5/14* (2013.01); *C08G 69/14* (2013.01); *C08G 69/24* (2013.01); *C08G 69/36* (2013.01); *C08G 69/40* (2013.01); *C08J 5/18* (2013.01); *C08L 9/08* (2013.01); *C08L 77/02* (2013.01); *C09J 7/25* (2018.01); *C09J 7/383* (2018.01); *C09J 161/12* (2013.01); *B60C 2005/145* (2013.01); *C08J 2377/02* (2013.01); *C08J 2377/12* (2013.01); *C08J 2477/00* (2013.01); *C09J 2453/006* (2013.01); *C09J 2461/00* (2013.01); *C09J 2471/006* (2013.01); *C09J 2477/006* (2013.01)

(58) Field of Classification Search
CPC .. B60C 1/0008; B60C 5/14; C09J 7/25; C09J 7/383; C09J 161/12; B32B 27/285; B32B 27/34; C08G 69/14; C08G 69/24; C08G 69/36; C08G 69/40; C08J 5/18; C08L 9/08; C08L 77/02
USPC ......................................................... 152/510
See application file for complete search history.

(56) References Cited

U.S. PATENT DOCUMENTS

| | | | |
|---|---|---|---|
| 4,331,786 A * | 5/1982 | Foy ......................... | C08G 69/44 525/408 |
| 5,936,044 A | 8/1999 | Melot | |
| 2013/0101821 A1* | 4/2013 | Jeon ......................... | B60C 5/14 428/215 |
| 2013/0192736 A1* | 8/2013 | Song ...................... | C09J 161/12 152/510 |

FOREIGN PATENT DOCUMENTS

| | | |
|---|---|---|
| CN | 1139939 | 1/1997 |
| JP | 2005-219565 | 8/2005 |
| JP | 4435253 | 3/2010 |
| JP | 2011-056812 | 3/2011 |
| KR | 10-2009-0047482 | 5/2009 |
| KR | 10-2013-0035978 | 4/2013 |
| WO | WO-2012/002750 A2 * | 1/2012 |

OTHER PUBLICATIONS

European Patent Office, Extended European Search Report (ESR) of Application No. 14817527.6, dated Nov. 28, 2016.
Search Report and Written Opinion, Patent Cooperation Treaty, dated Oct. 6, 2014, Application No. PCT/KR2014/005751.

* cited by examiner

*Primary Examiner* — Kelechi C Egwim
(74) *Attorney, Agent, or Firm* — Lex IP Meister, PLLC

(57) ABSTRACT

This disclosure relates to a polymer film including: a base film including polyamide-based resin including two or more different kinds of repeat units; and a copolymer including polyamide-based segments and polyether-based segments.

15 Claims, 1 Drawing Sheet

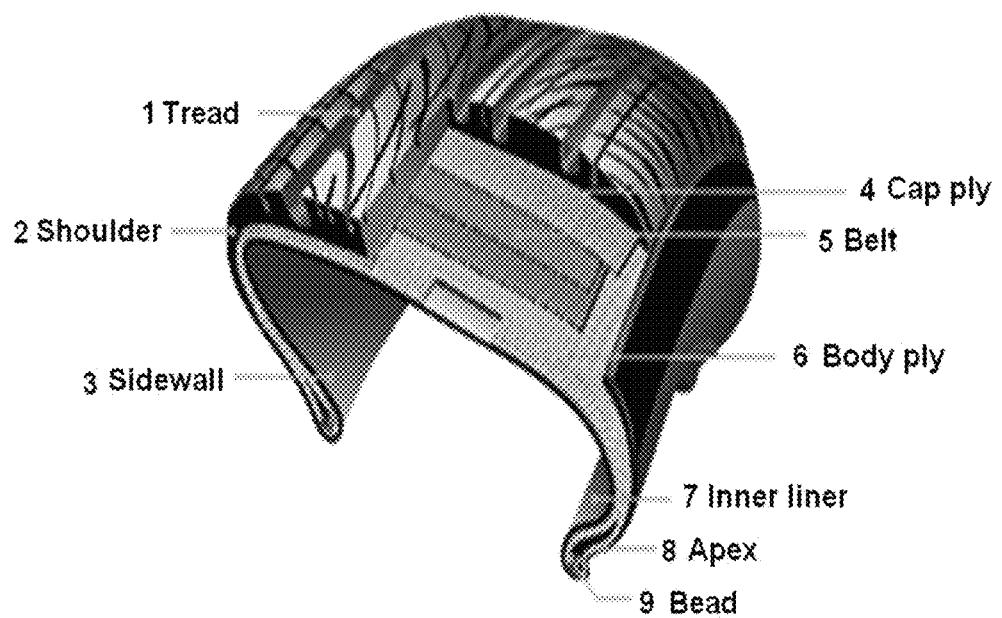

POLYMER FILM

FIELD OF THE INVENTION

The present invention relates to a polymer film, and more specifically, to a polymer film that may realize an excellent gas barrier property even with a thin thickness, and thus, when used as an inner liner, may reduce weight of a tire, improve fuel efficiency of an automobile, and secure excellent durability and fatigue resistance in a tire manufacturing process or in an automobile running process.

BACKGROUND OF THE INVENTION

A tire withstands the weight of an automobile, reduces impact from the road, and transfers driving force or braking force of an automobile to the ground. In general, a tire is a complex of fiber/steel/rubber, and has a structure as shown in FIG. 1.

Tread (1): a part contacting the road. It should afford frictional force required for driving, have good wear resistance, withstand external impact, and have low heat production.

Body Ply, or Carcass (6): a cord layer in the tire. It should support the vehicle weight, withstand impact, and have high fatigue resistance to bending and stretching while running.

Belt (5): it is located between the body plies, consists of steel wire in most cases, reduces external impact, and maintains a wide tread to afford excellent vehicle running stability.

Side Wall (3): a rubber layer between a part below a shoulder (2) and a bead (9). It protects the inner body ply (6).

Inner Liner (7): it is located inside the tire instead of a tube, and prevents air leakage to enable a pneumatic tire.

Bead (9): square or hexagonal wire bundle formed of rubber-coated steel wire. It positions and fixes the tire in a rim.

Cap Ply (4): a special cord located on a belt of a radial tire for some cars. It minimizes movement of the belt while running.

Apex (8): triangular rubber filler used to minimize dispersion of the bead, reduce external impact to protect the bead, and prevent air inflow during forming.

Recently, a tubeless tire into which high pressure air of 30 to 40 psi is injected has been commonly used without using a tube, and to prevent air leakage during automobile running, an inner liner having a high gas barrier property is positioned as the inner layer of the carcass.

Previously, a tire inner liner including a rubber such as butyl rubber, halobutyl rubber, and the like having relatively low air permeability as a main ingredient was used, but to achieve a sufficient gas barrier property of the inner liner, rubber content or inner liner thickness should be increased. However, if rubber content and tire thickness increase, total weight of the tire may increase and fuel efficiency of an automobile may be degraded.

Further, since the rubber ingredients have relatively low heat resistance, air pockets may be generated between rubber in the inner surface of a carcass layer and the inner liner, or the shape or physical properties of the inner liner may be changed in a vulcanization process of a tire or in an automobile running process during which repeated deformations occur at a high temperature. To bond the rubber ingredients to a carcass layer of a tire, a vulcanizer should be used or a vulcanization process should be applied, but sufficient adhesion could not be secured therewith.

Previously known methods have limitations in maintaining excellent air permeability and formability of a tire while sufficiently decreasing the thickness and the weight of the inner liner. The inner liner manufactured by previously known methods exhibited many problems such as property degradation, generation of cracks, and the like, in a tire manufacturing process during which repeated deformations occur at a high temperature, or in an automobile running process during which repeated deformations occur and high heat is generated.

With the recent increase in oil price, there has been increasing interest in eco-friendly tires that can improve fuel efficiency of automobiles, and there have been attempts to reduce tire weight or contact area through modification of tire compounds or changes in tread design and the like. However, according to previously known methods, there was a limit in reducing tire weight and improving automobile fuel efficiency while improving shape stability of tires.

DETAILED DESCRIPTION OF THE INVENTION

Technical Objectives

There is provided a polymer film that may realize an excellent gas barrier property even with a thin thickness, and thus, when used as an inner liner, may reduce weight of a tire, improve fuel efficiency of an automobile, and secure excellent durability and fatigue resistance in a tire manufacturing process or in an automobile running process.

There is also provided a pneumatic tire using the polymer film as an inner liner.

Technical Solutions

There is provided a polymer film including: a base film including polyamide-based resin including different two kinds of repeat units; and a copolymer including polyamide-based segments and polyether-based segments.

There is also provided a pneumatic tire using the polymer film as an inner liner.

Hereinafter, a polymer film and a pneumatic tire according to specific embodiments of the invention will be explained in detail.

As used herein, 'alkylene' refers to a divalent functional group derived from an alkane, 'arylene' refers to a divalent functional group derived from an arene, and 'aryl alkylene' refers to a divalent functional group derived from a compound including an arene and an alkane.

According to one embodiment of the invention, provided is a polymer film including: a base film including a polyamide-based resin including different two or more kinds of repeat units; and a copolymer including polyamide-based segments and polyether-based segments.

As results of studies by the inventors, it was confirmed that a polymer film including a base film that is formed using a polyamide-based resin including two or more kinds of repeat units and the above-described specific copolymer may realize an excellent gas barrier property even with a thin thickness, and thus, may reduce the weight of a tire, improve the fuel efficiency of a tire, and secure excellent durability and fatigue resistance in a tire manufacturing process or in an automobile running process, and it may be strongly bonded to a tire without applying an additional vulcanization process or significantly increasing the thickness of an adhesive layer.

Particularly, by including the polyamide-based resin including two or more different kinds of repeat units, the base film and the polymer film may have a low modulus and high elasticity and durability while securing a high gas barrier property, and may exhibit largely reduced crystallinity at a high temperature.

Specifically, the polyamide-based resin including two or more different kinds of repeat units may be synthesized using two or more kinds of monomers, or may be obtained by copolymerizing two or more kinds of polyamide-based polymers.

The polyamide-based resin included in the base film, due to its unique molecular chain property, exhibits an excellent gas barrier property, for example, about a 10 to 20 times higher gas barrier property compared to butyl rubber and the like commonly used in a tire with the same thickness, and it exhibits a modulus that is not so high compared to other resins.

Particularly, the polyamide-based resin including two or more different kinds of repeat units has higher relative viscosity compared to a polyamide-based resin including only one kind of monomer (for example, caprolactam) or one kind of repeat unit, thus increasing the gas barrier property of the prepared base film and polymer film together with the mechanical properties such as durability and the like.

The polyamide-based resin including two or more different kinds of repeat units exhibits a low modulus and low crystallinity, thus preventing crystallization of the film itself or generation of damage such as crack and the like inside the film, even in a tire manufacturing process during which significant deformation occurs under a high temperature condition or in an automobile running process during which repeated deformations are continuously applied.

The copolymer including polyamide-based segments, polyether-based segments, and the polyamide-based resin, which are included in the base film, may form a crosslink. In the process of forming the base film, the copolymer and the polyamide-based resin may be mixed or extruded above a specific temperature (for example, at 100° C. or more), during which the copolymer and the polyamide-based resin may react to form the crosslink. The crosslink may form a polymer or copolymer by bonding the copolymer and the polyamide-based resin.

The base film may also include a copolymer including polyamide-based segments, polyether-based segments, and polyamide-based resin, which are dispersed in the base film, in addition to the crosslinked product of the copolymer including polyamide-based segments, polyether-based segments, and the polyamide-based resin.

That is, the base film may include the crosslinked product of the copolymer and the polyamide-based resin, and it may also include the crosslinked product, and the copolymer and the polyamide-based resin that are mixed with the crosslinked product.

The base film may have an excellent gas barrier property and a relatively low modulus, by using the copolymer including polyether-based segments which afford an elastomeric property together with the polyamide-based resin including two or more different kinds of repeat units. The polyether-based segments included in the copolymer may be bonded or dispersed between the polyamide-based segments or the polyamide-based resins, thus further lowering the modulus of the base film, inhibiting an increase in brittleness of the base film, and preventing crystallization at a high temperature.

Specifically, the polyamide-based resin included in the base film may include two or more different kinds of repeat units, and at least one kind of the repeat units of the polyamide-based resin may include a repeat unit of the following Chemical Formula 1.

[Chemical Formula 1]

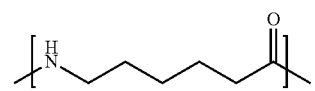

The polyamide-based resin may further include repeat units of the following Chemical Formula 2 or Chemical Formula 3, in addition to the repeat unit of the Chemical Formula 1.

[Chemical Formula 2]

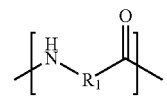

In Chemical Formula 2, $R_1$ is a linear or branched alkylene group having 2 to 4 or 6 to 15 carbon atoms, a arylene group having 6 to 20 carbon atoms, or a linear or branched arylalkylene group having 7 to 20 carbon atoms.

[Chemical Formula 3]

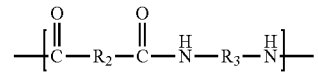

In Chemical Formula 3, $R_2$ is a linear or branched alkylene group having 1 to 20 carbon atoms, and $R_3$ is a linear or branched alkylene group having 1 to 20 carbon atoms, a arylene group having 6 to 20 carbon atoms, or a linear or branched arylalkylene group having 7 to 20 carbon atoms.

If the polyamide-based resin includes the repeat units of Chemical Formula 2 or Chemical Formula 3 in addition to the repeat unit of Chemical Formula 1, in the process of forming the base film, hydrogen bonding between the amide groups of the polyamide-based resin may be inhibited and the formed bond may be irregular. Thus, the base film including the polyamide-based resin has relatively a low crystallization speed at a high temperature, and property degradation due to brittleness by crystallization is small, thus it may have high durability together with a low modulus property.

The polyamide-based resin may include 0.5 wt % to 20 wt %, or 1 to 18 wt %, of the repeat units of the Chemical Formula 2.

The polyamide-based resin may include 0.5 wt % to 20 wt %, or 1 to 18 wt %, of the repeat units of the Chemical Formula 3.

If the content of the repeat units of the Chemical Formula 2 or Chemical Formula 3 in the polyamide-based resin is too small, it may be difficult to realize the above-explained effects of inhibiting crystallization by delaying crystallization or the effect of inhibiting property degradation by controlling brittleness of the base film. If the content of the repeat units of Chemical Formula 2 or Chemical Formula 3 in the polyamide-based resin is too high, thermal stability of the base film may be lowered, and thus mechanical properties or durability of the polymer film may be degraded.

The polyamide-based resin including two or more different kinds of repeat units may be synthesized using two or more kinds of monomers, or it may be obtained by copolymerizing two or more kinds of polyamide-based polymers.

Specifically, the polyamide-based resin including two or more different kinds of repeat units may be synthesized using 2-azetidinone, 2-pirrolidone, δ-valerolactam, 1-aza-2-cyclooctanone, 2-azacyclononanone, 10-aminodecanoic acid, 11-aminoundecanoic acid, laurolactam, or a mixture thereof in addition to ε-caprolactam as monomers, and it may be synthesized by selectively using dicarboxylic acid and diamine compounds.

The carboxylic acid that can be used may include malonic acid, succinic acid, glutaric acid, adipic acid, pimelic acid, suberic acid, azelaic acid, sebacic acid, dodecanedioic acid, isophthalic acid, terephthalic acid, or a mixture thereof. The diamine compound that can be used may include 1,4-diaminobutane, 1,5-diaminopentane, hexamethylene diamine, 1,7-diaminoheptane, 1,8-diaminooctane, 1,10-decanediamine, m-xylene diamine, or a mixture thereof. The polyamide-based resin including two or more different kinds of repeat units may also be synthesized by copolymerizing a polymer including the repeat units of Chemical Formula 1 and a polymer including the repeat units of Chemical Formula 2 or Chemical Formula 3.

Meanwhile, the polyamide-based resin including two or more different kinds of repeat units may have higher relative viscosity compared to nylon 6 and the like. Specifically, the polyamide-based resin including two or more different kinds of repeat units may have relative viscosity of 3.0 to 4.0, or 3.3 to 3.8 (sulfuric acid 96% solution).

If the viscosity of the polyamide-based resin is less than 3.0, sufficient elongation may not be secured due to a decrease in toughness, and thus damage may be generated during a tire manufacturing process or automobile running, and crystallization speed may increase with heat, and thus the effect of delaying crystallization by controlling brittleness of the base film may not be sufficiently manifested.

If the relative viscosity of the polyamide-based resin including two or more different kinds of repeat units is greater than 4.0, the modulus or the viscosity of the prepared base film may become unnecessarily high, the efficiency and the economic feasibility of the preparation process may be lowered, it may be difficult for a tire inner liner to have appropriate formability or elasticity, and compatibility with a copolymer including polyamide-based segments and polyether-based segments may be lowered to cause property non-uniformity of the base film.

The relative viscosity of the polyamide-based resin refers to relative viscosity measured using a 96% sulfuric acid solution at room temperature. Specifically, a specimen of a polyamide-based resin (for example, a 0.025 g specimen) is dissolved in a 96% sulfuric acid solution at various concentrations to prepared two or more measurement solutions (for example, a polyamide-based resin specimen is dissolved in 96% sulfuric acid to concentrations of 0.25 g/dL, 0.10 g/dL, and 0.05 g/dL to prepare 3 measurement solutions), and then the relative viscosity of the measurement solutions (for example, the ratio of the average passing time of the measurement solutions to the passing time of the sulfuric acid 96% solution through a viscosity tube) may be calculated using a viscosity tube at 25° C.

Meanwhile, since the copolymer including polyamide-based segments and polyether-based segments exists while being bonded or dispersed between the polyamide-based resins, it may further lower the modulus of the base film layer, inhibit an increase in brittleness of the base film layer, and prevent crystallization at a high temperature. As such a copolymer is included in the base film layer, the polymer film may achieve high elasticity or elasticity recovery rate, while securing excellent mechanical properties such as durability, heat resistance, fatigue resistance, and the like. Thus, the polymer film may exhibit excellent formability, and a tire using the polymer film as an inner liner may not be physically damaged even in an automobile running process during which repeated deformations and high heat are continuously generated, and the properties or performance of the tire may not be degraded.

The copolymer including polyamide-based segments and polyether-based segments may be a block copolymer wherein the segments are bonded while forming blocks, or it may be a random copolymer wherein the segments are irregularly bonded. The copolymer including polyamide-based segments and polyether-based segments may be a copolymer including a polymerization product of a polymer including polyamide-based segments and a polymer including polyether-based segments.

The content of the polyether-based segments included in the copolymer may be 2 wt % to 40 wt %, or 4 to 20 wt %, in the base film. If the content of the polyether-based segments is less than 2 wt % based on the total weight of the base film, the modulus of the base film or the polymer film may increase, and thus, when the film is used as an inner liner, tire formability may be degraded, or property degradation due to repeated deformations may significantly occur. If the content of the polyether-based segments is greater than 40 wt % based on the total weight of the base film, the gas barrier property of the polymer film may be lowered, the polymer film used as an inner liner may not be easily adhered to a carcass layer due to lowered reactivity to an adhesive, and a uniform film may not be easily manufactured due to increased elasticity of the base film.

The polyether-based segments may be bonded with the polyamide-based segments or may be dispersed between the polyamide-based resins, and they may inhibit growth of large crystals in the base film layer or prevent the base film layer from being easily broken in a tire manufacturing process or in an automobile running process.

The polyamide-based segments may function for preventing a significant increase in the modulus property while affording mechanical properties over a certain level to the copolymer. In addition, as the polyamide-based segments are applied, the base film layer may have low air permeability while having a thin thickness, and may have sufficient heat resistance and chemical stability.

Specifically, the polyamide-based segments may be main repeat units included in a polyamide-based resin selected from the group consisting of nylon 6, nylon 66, nylon 46, nylon 11, nylon 12, nylon 610, nylon 612, a copolymer of nylon 6/66, a copolymer of nylon 6/66/610, nylon MXD6, nylon 6T, a copolymer of nylon 6/6T, a copolymer of nylon 66/PP, a copolymer of nylon 66/PPS, a methoxymethylated product of 6-nylon, a methoxymethylated product of 6-610-nylon, and a methoxymethylated product of 612-nylon. For example, the main repeat unit of nylon 6 is known to have the following Chemical Formula 1, wherein $R_1$ is a C5 alkylene, and other main repeat units of the polyamide-based resin are also known to one of ordinary knowledge in the art.

The polyamide-based segments of the copolymer may include the repeat units of the following Chemical Formula 11 or Chemical Formula 12.

[Chemical Formula 11]

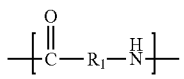

In Chemical Formula 11, $R_1$ is a linear or branched alkylene group having 1 to 20 carbon atoms or a linear or branched arylalkylene group having 7 to 20 carbon atoms.

[Chemical Formula 12]

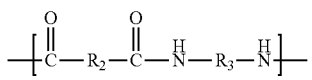

In the Chemical Formula 12, $R_2$ is a linear or branched alkylene group having 1 to 20 carbon atoms, and $R_3$ is a linear or branched alkylene group having 1 to 20 carbon atoms or a linear or branched arylalkylene group having 7 to 20 carbon atoms.

Meanwhile, the polyether-based segment refers to a repeat unit including an alkylene oxide (-alkyl-O—) group, and it may be formed from a polyether-based resin participating in polymerization or a precursor thereof.

The polyether-based segment may be a main repeat unit that can be included in a polyalkylene glycol resin or derivatives thereof, wherein the polyalkylene glycol derivatives may be derivatives substituted at the end of polyalkylene glycol resin with an amine group, a carboxylic group, an isocyanate group, and the like, preferably with an amine group Preferably, the polyether-based segments may be main repeat units included in a polyether-based resin selected from the group consisting of polyethylene glycol, polypropylene glycol, polytetramethylene glycol, polyoxyethylene diamine, polyoxypropylene diamine, polyoxytetramethylene diamine, and copolymers thereof.

The polyether-based segment of the copolymer may include a repeat unit of the following Chemical Formula 13.

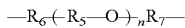 [Chemical Formula 13]

In Chemical Formula 13, $R_5$ is a linear or branched alkylene group having 1 to 10 carbon atoms, n is an integer of 1 to 100, and $R_6$ and $R_7$ may be identical or different, and respectively are a direct bond, —O—, —NH—, —COO—, or —CONH—.

The copolymer including polyamide-based segments and polyether-based segments may have a weight average molecular weight of 50,000 to 300,000, preferably 100,000 to 250,000. If the weight average molecular weight of the copolymer is less than 50,000, sufficient mechanical properties required for use as an inner liner film may not be secured, and if the weight average molecular weight of the copolymer is greater than 300,000, the modulus or crystallinity of the base film may excessively increase when heated to a high temperature, and elasticity or an elasticity recovery rate required for an inner liner film may not be secured.

The weight average molecular weight of the basic unit included in the polyether-based segments may be 500 to 10,000, preferably 1000 to 3000. The basic unit included in the polyether-based segments may include a repeat unit of Chemical Formula 13. If the weight average molecular weight of the basic unit included in the polyether-based segments is less than 500, the effect of inhibiting the growth of large crystals in the polymer film or the effect of decreasing the modulus may not be properly achieved, and if it is greater than 10,000, the gas barrier property of the inner liner may be lowered.

As long as the above-explained content ratio of the polyether-based segments in the base film [2 wt % to 40 wt %, or 4 to 20 wt %] is maintained, the copolymer may include the polyamide-based segments and the polyether-based segments at a specific weight ratio, and the base film may include (a) a polyamide-based resin including two or more different kinds of repeat units and (b) a copolymer including polyamide-based segments and polyether-based segments at a specific weight ratio.

For example, the copolymer including polyamide-based segments and polyether-based segments may include the polyamide-based segment and the polyether-based segments at a weight ratio of 1:9 to 9:1, 2:8 to 8:2, or 3:7 to 7:3.

For example, the base film may include (a) a polyamide-based resin including two or more different kinds of repeat units and (b) a copolymer including polyamide-based segments and polyether-based segments at a weight ratio [a:b] of 9:1 to 2:8, or 8:2 to 3:7.

Meanwhile, the base film may further include nylon 6 resin, in addition to the polyamide-based resin including two or more different kinds of repeat units and the copolymer including polyamide-based segments and polyether-based segments. The content of the nylon 6 may be determined according to the properties or characteristics of the finally prepared base film, and for example, it may be included in the content of 1 wt % to 60 wt % in the base film.

The base film layer may have a thickness of 30 to 300 μm, preferably 40 to 250 μm, more preferably 40 to 200 μm. Thereby, the polymer film according to one embodiment of the invention may have low air permeability, for example oxygen permeability of 200 cc/(m²·24 h·atm) or less, while having a thin thickness, compared to those previously known.

The base film layer may be an unstretched film. If the base film layer is an unstretched film, it may have a low modulus and high strain, and thus it may be appropriately applied in a tire forming process during which high expansion is generated. Further, since crystallization hardly occurs in the unstretched film, damage such as cracks and the like may be prevented even if deformations repeatedly occur. In addition, since the unstretched film does not have a large property difference and orientation in a specific direction, an inner liner having uniform properties may be obtained.

The polymer film may further include an adhesive layer that is formed at at least one side of the base film and includes a resorcinol-formalin-latex (RFL)-based adhesive.

The adhesive layer including the resorcinol-formalin-latex (RFL)-based adhesive has excellent adhesion and adhesion maintaining performance to the base film layer and a tire carcass layer, and thus it may prevent breaking of an interface between an inner liner film and a carcass lays, which is generated by heat or repeated deformations in a tire manufacturing process or a running process, to afford sufficient fatigue resistance to the polymer film attached inside a tire as an inner liner.

It is considered that the main properties of the adhesive layer result from inclusion of the resorcinol-formalin-latex (RFL)-based adhesive of a specific composition. Previously, as an adhesive for a tire inner liner, a rubber-type tie gum and the like was used, and thus an additional vulcanization process was required. To the contrary, since the adhesive layer includes the resorcinol-formalin-latex (RFL)-based adhesive of a specific composition, it has high reactivity and adhesion to the base film, and it may be compressed under a high temperature heating condition to firmly adhere the base film to a carcass layer without significantly increasing the thickness. Thus, the weight of a tire may be reduced, the fuel efficiency of automobiles may be improved, and separation between a carcass layer and an inner liner layer or between the base film and the adhesive layer may be prevented even if deformations occur repeatedly in a tire manufacturing process or in an automobile running process. Further, since the adhesive layer may exhibit high fatigue resistance to physical/chemical deformations that may be applied in a tire manufacturing process or an automobile running process, it may minimize lowering of adhesion or other properties in a manufacturing process at a high temperature condition or in an automobile running process during which mechanical deformation is applied for a long time.

Furthermore, the resorcinol-formalin-latex (RFL)-based adhesive may exhibit adhesion performance due to crosslinking between latex and rubber, it is physically a latex polymer and thus has a flexible property like rubber due to low hardness, and a methylol end group of the resorcinol-formalin polymer and a base film may be chemically bonded. Thus, if the resorcinol-formalin-latex-(RFL)-based adhesive is applied to a base film, sufficient adhesion and high formability and elasticity may be achieved.

The resorcinol-formalin-latex (RFL)-based adhesive may include 2 to 32 wt %, preferably 10 to 20 wt %, of a condensate of resorcinol and formaldehyde, and 68 to 98 wt %, preferably 80 to 90 wt %, of a latex.

The condensate of resorcinol and formaldehyde may be obtained by mixing resorcinol and formaldehyde at a mole ratio of 1:0.3 to 1:3.0, preferably 1:0.5 to 1:2.5, and conducting condensation. The condensate of resorcinol and formaldehyde may be included in the content of 2 wt % or more based on the total weight of the adhesive layer in terms of a chemical reaction for excellent adhesion, and it may be included in the content of 32 wt % or less so as to secure adequate fatigue resistance.

The latex may be selected from the group consisting of natural rubber latex, styrene/butadiene rubber latex, acrylonitrile/butadiene rubber latex, chloroprene rubber latex, styrene/butadiene/vinylpyridine rubber latex, and a mixture thereof. The latex may be included in the content of 68 wt % or more based on total weight of the adhesive layer for flexibility and an effective crosslinking reaction with rubber, and it may be included in the content of 98 wt % or less for a chemical reaction with a base film and stiffness of the adhesive layer.

The adhesive layer may further include at least one additive such as a surface tension control agent, a heat resistant, an antifoaming agent, a filler, and the like, in addition to the condensate of resorcinol and formaldehyde. Although the surface tension control agent is applied for uniform coating of the adhesive layer, it may cause a decrease in adhesion when introduced in an excessive amount, and thus it may be included in the content of 2 wt % or less, or 0.0001 to 2 wt %, preferably 1.0 wt % or less, or 0.0001 to 0.5 wt %, based on the total weight of the adhesive layer. The surface tension control agent may be selected from the group consisting of a sulfonic acid salt anionic surfactant, a sulfate ester surfactant, a carboxylic acid salt anionic surfactant, a phosphate ester anionic surfactant, a fluorine-containing surfactant, a silicone-based surfactant, a polysiloxane-based surfactant, and a combination thereof.

The adhesive layer may have a thickness of 0.1 to 20 μm, preferably 0.1 to 10 μm, more preferably 0.2 to 7 μm, and still more preferably 0.3 to 5 μm, and it may be formed on one side or both sides of the base film.

If the thickness of the adhesive layer is too thin, the adhesive layer itself may become thinner when a tire is inflated, crosslinking adhesion between a carcass layer and a base film may be lowered, and stress may be concentrated on a part of the adhesive layer to degrade the fatigue property. If the thickness of the adhesive layer is too thick, interface separation may occur in the adhesive layer to degrade the fatigue property. To adhere the inner liner film to a carcass layer of a tire, an adhesive layer is generally formed on one side of the base film, but in case a multi-layered inner liner film is applied, or adhesion to rubber on both sides is required according to a tire forming method and construction design, for example when an inner liner film covers a bead part, the adhesive layer may be preferably formed on both sides of the base film.

According to another embodiment of the invention, a pneumatic tire including the polymer film as an inner liner is provided.

As explained above, since the polymer film of one embodiment may realize an excellent gas barrier property even with a thin thickness, a pneumatic tire including the polymer film as an inner liner may be light-weight compared to the previously known pneumatic tires, thus improving the fuel efficiency of an automobile. Moreover, since the polymer film of one embodiment exhibits a low modulus and low crystallinity, crystallization of the film itself or generation of damage such as cracks and the like inside the film may be prevented, even in a tire manufacturing process during which significant deformation occurs under a high temperature condition, or in an automobile running process during which repeated deformations are continuously applied.

The pneumatic tire may have a commonly known pneumatic tire structure, except including the above-explained specific polymer film. For example, the pneumatic tire may include: a tread part; one pair of shoulder parts respectively continued to both sides around the tread part; one pair of side wall parts respectively continued at the shoulder parts; one pair of bead parts respectively continued at the side wall parts; a body ply part formed at an inner side of the tread part, shoulder parts, side wall parts, and bead parts; a belt part and a cap fly part sequentially stacked between the inner side of the tread part and the body ply part; and an inner liner film bonded to the inner side of the body ply part.

Advantageous Effect of the Invention

According to the present invention, provided is a polymer film that may realize an excellent gas barrier property even with a thin thickness, and thus reduce the weight of a tire, improve the fuel efficiency of an automobile, and secure excellent durability and fatigue resistance even in a tire manufacturing process or an automobile running process, and a pneumatic tire including the polymer film as an inner liner.

BRIEF DESCRIPTION OF FIGURES

FIG. 1 schematically shows the structure of a pneumatic tire.

DETAILED DESCRIPTION OF THE EMBODIMENTS

Hereinafter, the embodiment of the present invention will be explained in detail with reference to the following examples. However, these examples are only to illustrate the invention and the scope of the invention is not limited thereto.

EXAMPLES AND COMPARATIVE EXAMPLES: MANUFACTURE OF A POLYMER FILM FOR AN INNER LINER

Example 1

(1) Preparation of a Base Film 50 wt % of a polyamide-based copolymer resin having relative viscosity (96% sulfuric acid solution) of 3.8 [synthesized using ε-caprolactam and δ-valerolactam at a weight ratio of 92:8] and 50 wt % of a copolymer resin having a weight average molecular weight of 145,000 [synthesized using 45 wt % or polyether-based segments having an amine end group and a polypropylene oxide main chain and 55 wt % of polyamide-based segments of caprolactam] were mixed.

Herein, the mixture was fed to an extrusion die while controlling the temperature of a part for supplying raw material to prevent fusion of the mixture to the screw of the extruder and resulting faulty feeding. The fed mixture was melted at a temperature of 260° C. and extruded through a T-type die (die gap—1.0 mm) while maintaining uniform flow of molten resin, and the molten resin was cooled and solidified to a film with a uniform thickness using an air knife on the surface of a cooling roll that is controlled to 25° C., thus obtaining an unstretched based film (E1) having a thickness of 100 um at a speed of 15 m/min.

(2) Coating of Adhesive

Resorcinol and formaldehyde were mixed at a mole ratio of 1:2, and then condensed to obtain a condensate of resorcinol and formaldehyde. 12 wt % of the condensate of resorcinol and formaldehyde and 88 wt % of styrene/butadiene-1,3/vinylpyridine were mixed to obtain resorcinol-formalin-latex (RFL)-based adhesive at a concentration of 20%.

The resorcinol-formalin-latex (RFL)-based adhesive was coated on the base film to a thickness of 1 um using a gravure coater, dried at 150° C. for 1 min, and reacted to form an adhesive layer.

Example 2

(1) Preparation of a Base Film 50 wt % of a polyamide-based copolymer resin having relative viscosity (96% sulfuric acid solution) of 3.3 [synthesized using ε-caprolactam and 2-azacyclononanone at a weight ratio of 85:15] and 50 wt % of a copolymer resin having a weight average molecular weight of 105,000 [synthesized using 20 wt % of polyether-based segments having an amine end group and a polypropylene oxide main chain and 80 wt % of polyamide-based segments of caprolactam] were mixed to obtain an unstretched base film (E2) having a thickness of 100 um by the same method as Example 1.

(2) Coating of Adhesive

By the same method as Example 1, the resorcinol-formalin-latex (RFL)-based adhesive was coated on the base film (E2) to a thickness of 1 um using a gravure coater, dried at 150° C. for 1 min, and reacted to form an adhesive layer.

Example 3

(1) Preparation of Base Film 50 wt % of a polyamide-based copolymer resin having relative viscosity (96% sulfuric acid solution) of 3.6 [synthesized using ε-caprolactam and 2-pyrrolidone at a weight ratio of 94:6] and 50 wt % of a copolymer resin having a weight average molecular weight of 85,000 [synthesized using 20 wt % of polyether-based segments having a polytetramethylene oxide main chain and 80 wt % of polyamide-based segments of caprolactam] were mixed to obtain an unstretched base film (E3) having a thickness of 100 um by the same method as Example 1.

(2) Coating of Adhesive

By the same method as Example 1, the resorcinol-formalin-latex (RFL)-based adhesive was coated on the base film (E3) to a thickness of 1 um using a gravure coater, dried at 150° C. for 1 min, and reacted to form an adhesive layer.

Example 4

(1) Preparation of Base Film 40 wt % of a polyamide-based copolymer resin having relative viscosity (96% sulfuric acid solution) of 3.6 [synthesized using ε-caprolactam and 2-pyrrolidone at a weight ratio of 94:6] and 60 wt % of a copolymer resin having a weight average molecular weight of 65,000 [synthesized using 60 wt % of polyether-based segments having a polytetramethylene oxide main chain and 40 wt % of polyamide-based segments of caprolactam] were mixed to obtain an unstretched base film (E4) having a thickness of 100 um by the same method as Example 1.

(2) Coating of Adhesive

By the same method as Example 1, the resorcinol-formalin-latex (RFL)-based adhesive was coated on the base film (E4) to a thickness of 1 um using a gravure coater, dried at 150° C. for 1 min, and reacted to form an adhesive layer.

Example 5

(1) Preparation of Base Film

An unstretched base film (E5) having a thickness of 100 um was obtained by the same method as Example 1, except mixing 70 wt % of the polyamide-based copolymer resin of Example 2, 20 wt % of a copolymer resin including polyether-based segments and polyamide-based segments, and 10 wt % of nylon 6 resin having relative viscosity of 3.6.

(2) Coating of Adhesive

By the same method as Example 1, resorcinol-formalin-latex (RFL)-based adhesive was coated on the base film (E5) to a thickness of 1 um using a gravure coater, dried at 150° C. for 1 min, and reacted to form an adhesive layer.

Example 6

(1) Preparation of Base Film 40 wt % of a polyamide-based copolymer resin having relative viscosity (96% sulfuric acid solution) of 3.6 [synthesized using ε-caprolactam and compounds of hexamethylene diamine and adipic acid at a weight ratio of 95:5] and 60 wt % of a copolymer resin having a weight average molecular weight of 125,000 [synthesized using 60 wt % of polyether-based segments having a polytetramethylene oxide main chain and 40 wt % of polyamide-based segments of caprolactam] were mixed to obtain an unstretched base film (E6) having a thickness of 100 um by the same method as Example 1.

(2) Coating of Adhesive

By the same method as Example 1, resorcinol-formalin-latex (RFL)-based adhesive was coated on the base film (E5) to a thickness of 1 um using a gravure coater, dried at 150° C. for 1 min, and reacted to form an adhesive layer.

COMPARATIVE EXAMPLE

(1) Preparation of Base Film 85 wt % of nylon 6 resin having relative viscosity (96% sulfuric acid solution) of 3.3 and 15 wt % of a copolymer resin having a weight average molecular weight of 45,000 [synthesized using 10 wt % of polyether-based segments having a polytetramethylene oxide main chain and 90 wt % of polyamide-based segments of caprolactam] were mixed to obtain an unstretched base film (CE1) having a thickness of 100 um by the same method as Example 1.

(2) Coating of Adhesive

By the same method as Example 1, the resorcinol-formalin-latex (RFL)-based adhesive was coated on the base film (CE1) to a thickness of 1 um using a gravure coater, dried at 150° C. for 1 min, and reacted to form an adhesive layer.

EXPERIMENTAL EXAMPLE

Experimental Example 1: Oxygen Permeability Test

For the tire inner line films obtained in the examples and comparative examples, oxygen permeability was measured under 25° C. and 60 RH % using a gas transmission rate tester (Model BR-1/BT-2, manufactured by Toyoseiki Seisaku-Sho Company) according to ASTM D 1434.

Experimental Example 2: Evaluation of the Properties of Film

The base film was allowed to stand at 23° C., relative humidity of 50% for 24 h, and then, with a sample length of 30 mm, a sample width of 30 mm, and tension speed of 300 mm/min, breaking strength, elongation at break, and strength at 2 5% elongation in the machine direction (MD) and the transverse direction (TD) of the base film were respectively measured 10 times using a tensile test machine (Instron Company), and the mean value of 8 values except the maximum value and minimum value was calculated.

After being allowed to stand at 23° C., relative humidity of 50% for 24 h, the base film was allowed to stand in a 170° C. hot-air oven for 1 h, and immediately afterward, under the same conditions as the tension measuring condition, breaking strength, elongation at break, and strength at 25% elongation in the MD and TD of the heat treated base film were respectively measured 10 times, and the mean value of 8 values except the maximum value and minimum value was calculated.

Brittleness of the base film was indicated by the modulus at 25% elongation obtained from the tensile evaluation. Durability of the base film was calculated from the toughness maintenance rate of the base film before and after heat treatment.

(1) Evaluation of Brittleness

Brittleness change due to heat treatment was indicated by change in strength at 25% elongation, when the base film was elongated before/after heat treatment, and brittleness in MD and TD of the base film was calculated by the following Equation 1.

$$\text{Brittleness (\%)} = [\text{strength at 25\% elongation after heat treatment (MPa)/strength at 25\% elongation before heat treatment (MPa)}]*100(\%) \quad \text{<Equation 1>}$$

(2) Evaluation of Durability

Using the breaking strength and elongation at break of the base film before/after heat treatment, toughness of MD and TD of the base film was calculated by the following Equation 2, and durability of MD and TD of the base film before/after heat treatment was calculated by the following Equation 3.

$$\text{Toughness of base film (MPa)} = \text{breaking strength (MPa)} \times \text{SQRT [elongation at break (\%)]} \quad \text{<Equation 2>}$$

(wherein SQRT denotes square root.)

$$\text{Durability of base film (\%)} = [\text{toughness of base film after heat treatment/toughness of base film before heat treatment}]*100(\%) \quad \text{<Equation 3>}$$

Experimental Example 3: Measurement of Formability

Using the tire inner liner films of the examples and comparative examples, 100 tires were manufactured with a standard of 205R/65R16. During the tire manufacturing process, manufacturability and appearance were evaluated after preparing a green tire, and the final appearance of a tire was examined after vulcanization.

Herein, when there was no crushing of the green tire or the vulcanized tire and the standard deviation of the diameter was within 5%, it was evaluated as 'good'. Further, when the green tire or the vulcanized tire was crushed, and thus a tire was not properly manufactured, the inner liner inside the tire was melted or torn and thus damaged, or when the standard deviation of the diameter was greater than 5%, it was evaluated as 'faulty'.

For the 100 tires manufactured using the tire inner liner films of the examples and comparative examples, the number of tires having good appearance was confirmed to evaluate formability, wherein formability was calculated by the following Equation 4.

$$\text{Formability (\%)} = [\text{The number of tires evaluated as 'good'}/100 \text{ (the number of manufactured tires)}]*100(\%) \quad \text{<Equation 4>}$$

Experimental Example 4: Measurement of Tire Durability

The durability of a tire was tested and evaluated while increasing a load, according to the FMVSS139 tire durability measuring method. The measurement of durability was conducted by two methods of an endurance test which increases load by step loading, and a high speed test which increases speed, and it was confirmed whether or not a crack was generated inside a tire, wherein it was indicated as 'good' when there was no crack, and as 'faulty' when a crack was generated.

The final appearance of tires was evaluated by the method of Experimental Example 3, 20 tires with 'good' appearance were selected, and an endurance test and a high speed test were progressed for 10 tires to confirm whether or not a crack was generated. After measuring durability for 10 tires, the durability of tires according to the endurance test and high speed test was calculated by the following Equation 5, using the number of 'good' tires without 'crack' generation.

The durability of tires (%)=[The number of 'good' tires/10 (the number of evaluated tires)]*100(%) <Equation 5>

The results of Experimental Examples 1 to 4 are shown in the following Table 1.

TABLE 1

| | | Example 1 | Example 2 | Example 3 | Example 4 | Example 5 | Example 6 | Comparative Example |
|---|---|---|---|---|---|---|---|---|
| Oxygen permeability [cc/(m² · 24 h · atm)] | | 86 | 67 | 35 | 110 | 56 | 71 | 12 |
| Brittleness (%) | Machine direction (MD) | 180 | 192 | 215 | 165 | 207 | 185 | 450 |
| | Transverse direction (TD) | 176 | 190 | 216 | 161 | 205 | 178 | 397 |
| Base film Durability (%) | Machine direction (MD) | 93 | 86 | 78 | 89 | 87 | 91 | 18 |
| | Transverse direction (TD) | 89 | 79 | 69 | 85 | 71 | 85 | 15 |
| Formability (%) | | 100 | 100 | 99 | 100 | 98 | 100 | 11 |
| Durability of tires (%) | Endurance Test | 100 | 100 | 90 | 90 | 100 | 100 | 0 |
| | High Speed Test | 100 | 100 | 100 | 100 | 100 | 100 | 10 |

As shown in the Table 1, it was confirmed that the polymer films for an inner liner obtained in Examples 1 to 6 have low oxygen permeability, and yet do not exhibit significant change in brittleness or durability of the film before and after heat treatment at a high temperature. Further, the polymer films for an inner liner obtained in Examples 1 to 6 may secure high formability of tires, and afford high durability to practical pneumatic tires even in an automobile running process during which rotations and deformations are repeatedly applied.

That is, the polymer films for an inner liner obtained in Examples 1 to 6 exhibit a low modulus and low crystallinity, thus preventing crystallization of the film itself or damage such as cracks inside the films even in a tire manufacturing process during which significant deformation occurs under a high temperature condition or in an automobile running process during which deformations are repeatedly applied.

On the other hand, it was confirmed that although the polymer film of a comparative example that uses high contents of nylon 6 and includes low contents of polyether-based segments in the base film exhibits lower oxygen permeability compared to the examples, brittleness of the film significantly increases and durability is lowered after heat treatment at high temperature. It was also confirmed that using the polymer film of the comparative example, it is not easy to form into a green tire or a pneumatic tire, and that a pneumatic tire including the polymer film of the comparative example cannot secure sufficient durability to withstand high speed high pressure deformation applied in a practical automobile running process.

What is claimed is:

1. A polymer film comprising: a base film comprising a polyamide-based resin comprising two or more different kinds of repeat units; and a copolymer comprising polyamide-based segments and polyether-based segments, wherein the polyamide-based resin includes a repeat unit of the following Chemical Formula 1 and 0.5 wt % to 20 wt % of a repeat units of the following Chemical Formula 2:

[Chemical Formula 1]
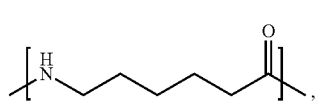

[Chemical Formula 2]
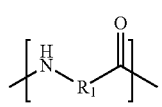

wherein, in Chemical Formula 2, $R_1$ is a linear or branched alkylene group having 2 to 4 carbon atoms.

2. The polymer film according to claim 1, wherein the polymer film is used as a tire inner liner.

3. The polymer film according to claim 1, wherein the polyamide-based resin further comprises a repeat unit of the following Chemical Formula 3:

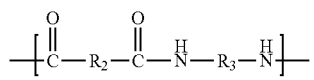

[Chemical Formula 3]

wherein, in Chemical Formula 3,
$R_2$ is a linear or branched alkylene group having 1 to 20 carbon atoms, and
$R_3$ is a linear or branched alkylene group having 1 to 20 carbon atoms, an arylene group having 6 to 20 carbon atoms, or a linear or branched arylalkylene group having 7 to 20 carbon atoms.

4. The polymer film according to claim 3, wherein the polyamide-based resin comprises 0.5 wt % to 20 wt % of the repeat units of Chemical Formula 3.

5. The polymer film according to claim 1, wherein the polyamide-based copolymer has a relative viscosity (96% sulfuric acid solution) of 3.0 to 4.0.

6. The polymer film according to claim 1, wherein the copolymer comprising polyamide-based segments, polyether-based segments, and polyamide-based resin form a crosslink.

7. The polymer film according to claim 1, wherein the content of the polyether-based segments in the base film is 2 wt % to 40 wt %.

8. The polymer film according to claim 1, wherein the content of the polyether-based segments in the base film is 4 wt % to 20 wt %.

9. The polymer film according to claim 1, wherein the copolymer comprising polyamide-based segments and polyether-based segments has a weight average molecular weight of 50,000 to 300,000.

10. The polymer film according to claim 1, wherein the basic unit of the polyether-based segment has a weight average molecular weight of 500 to 10,000.

11. The polymer film according to claim 1, wherein the base film has a thickness of 30 μm to 300 μm.

12. The polymer film according to claim 1, wherein the base film further comprises a nylon 6 resin.

13. The polymer film according to claim 1, further comprising an adhesive layer that is formed at at least one side of the base film and that comprises a resorcinol-formalin-latex (RFL)-based adhesive.

14. The polymer film according to claim 13, wherein the adhesive layer has a thickness of 0.1 μm to 20 μm.

15. A pneumatic tire comprising the polymer film of claim 1 as an inner liner.

* * * * *